US012617440B1

(12) United States Patent　　　　　(10) Patent No.:　US 12,617,440 B1

Emig　　　　　　　　　　　　　　　　(45) Date of Patent:　　　May 5, 2026

(54) GAME CART

(71) Applicant: Bradley R. Emig, Aviston, IL (US)

(72) Inventor:　Bradley R. Emig, Aviston, IL (US)

( * ) Notice:　Subject to any disclaimer, the term of this patent is extended or adjusted under 35 U.S.C. 154(b) by 248 days.

(21) Appl. No.: 18/400,460

(22) Filed:　Dec. 29, 2023

Related U.S. Application Data

(60) Provisional application No. 63/548,263, filed on Nov. 13, 2023.

(51) Int. Cl.
　　*B62B 1/18*　　　　(2006.01)
　　*B62B 5/00*　　　　(2006.01)

(52) U.S. Cl.
　　CPC .............. *B62B 1/18* (2013.01); *B62B 5/0043* (2013.01); *B62B 5/0059* (2013.01); *B62B 2202/42* (2013.01)

(58) Field of Classification Search
　　CPC . B62B 1/18; F16H 7/08; F16H 7/0827; F16H 7/0829; F16H 7/10; F16H 7/12; F16H 7/14
　　See application file for complete search history.

(56)　　　　　　References Cited

U.S. PATENT DOCUMENTS

| | | | | |
|---|---|---|---|---|
| 1,394,703 | A | * | 10/1921 | Wright ........................... 242/392 |
| 2,474,457 | A | * | 6/1949 | Barth .................... F16H 7/0827 |
| | | | | 474/119 |

| | | | | |
|---|---|---|---|---|
| 3,278,159 | A | * | 10/1966 | Jack ........................ B62D 57/00 |
| | | | | 254/389 |
| 5,295,556 | A | | 3/1994 | Mullin |
| 5,489,000 | A | * | 2/1996 | Hillbohm .................. B62B 1/18 |
| | | | | 180/19.1 |
| 6,793,236 | B1 | * | 9/2004 | Mitchell ................. B62B 5/005 |
| | | | | 280/47.24 |
| 9,986,731 | B2 | | 6/2018 | Mitchell et al. |
| 10,099,732 | B2 | * | 10/2018 | Ho ......................... B62B 5/0026 |
| 11,198,459 | B1 | | 12/2021 | Dudley |
| 12,285,364 | B2 | * | 4/2025 | Anderson ............ A61G 1/0293 |
| 12,371,086 | B2 | * | 7/2025 | Huang ...................... B62B 3/08 |
| 2004/0084864 | A1 | | 5/2004 | Casey et al. |
| 2004/0130112 | A1 | | 7/2004 | Doyle |
| 2010/0253023 | A1 | | 10/2010 | Loomans |
| 2016/0039445 | A1 | | 2/2016 | Sommers |
| 2024/0425095 | A1 | * | 12/2024 | Bohn .................... B62B 5/0053 |

FOREIGN PATENT DOCUMENTS

JP　　　　　　3936978 B1　*　6/2007　　............. B62B 5/068

* cited by examiner

*Primary Examiner* — Steve Clemmons

(74) *Attorney, Agent, or Firm* — Grace J. Fishel

(57)　　　　　　　　ABSTRACT

A wedge shaped game cart with handles and a fender over a single wheel. Struts support a forward end of the fender mounted on the handles forward of an axle for the wheel. An electric motor is mounted on the fender forward of the axle and is connected by a chain drive to a driven sprocket on the wheel. An idler sprocket for the chain drive when disconnected from the drive sprocket allows the cart to be manually pushed without engaging the motor and a cable selectively attached to the driven sprocket allows the cart to be pulled when connected to the drive sprocket.

10 Claims, 3 Drawing Sheets

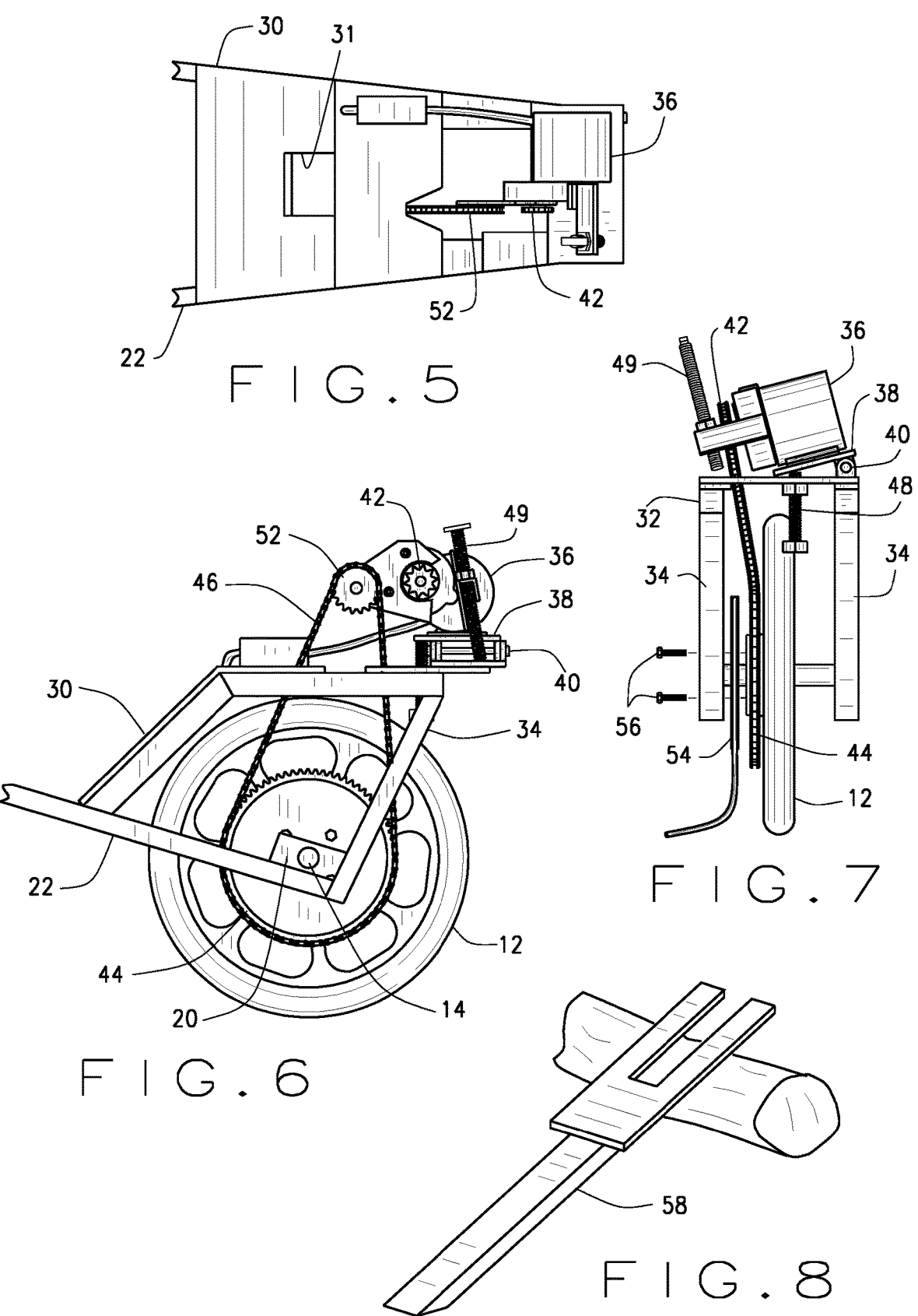
F I G . 5
F I G . 6
F I G . 7
F I G . 8

GAME CART

BACKGROUND OF THE INVENTION

Field of the Invention

The present invention relates to a motorized low center of gravity, one wheel game cart wherein the weight of a game carcass can be shifted on the handle frame towards the wheel and is partial balanced by a disengageable motor with the wheel serving as a point of support.

Brief Description of the Prior Art

A game cart can be a valuable tool for a big game hunter in a remote area where game may be more plentiful, particularly if the hunter is alone. After a successful hunt, the hunter must transport the harvested deer or other game from the hunting spot back to a base camp or a vehicle. Remote areas often feature uneven and challenging terrain and dragging a large and heavy animal is physically demanding. In addition dragging a deer over rough terrain can damage the meat, hide or antlers and may further leave a scent trail that can alert other wildlife in the area. Field butchering the animal and carrying out the quarters is another possibility but is prohibited in some areas.

The above problem has not escaped the attention of other product developers but existing carts are cumbersome multi-wheeled devices that get caught in the undergrowth or have a high center of gravity when loaded. Most are not motorized and require two people for effective use and, if motorized, add the weight of the motor to the hunter's load.

BRIEF SUMMARY OF VARIOUS PREFERRED EMBODIMENTS OF THE INVENTION

In view of the above, it is an object of the present invention to provide an improved game cart that addresses the above shortcomings. Other objects and features of the invention will be in part apparent and in part pointed out hereinafter.

In accordance with the invention, a motorized game cart is provided with a single wheel carried on an axle. First and second handles form a frame upon which the axle is mounted at a front end. The first and second handles are separated a shoulder width at a rear end and a smaller distance at the front end providing a wedge shape that facilitates moving the cart through tall grass, brush, branches and the like.

In an embodiment, an L-shaped fender is mounted on the first and second handles adjacent the front end which allows a hunter to load an animal with the heavy end abutted against the fender but with the body shielded from contact with the wheel. This position distributes the weight of the animal as far away from the hunter as possible.

Further embodiments have first and second struts mounted on the first and second handles forward of the axle to support a free end of the L-shaped fender and provide a platform upon which an electric motor is mounted forward of the axle. The wheel is the pivot point of the cart and by positioning the motor opposite the game, the weight of the motor helps to counterbalance the weight of the game.

In other structures the electric motor is mounted on a pivot and connected to a drive sprocket. A drive chain interconnects the drive sprocket with a driven sprocket on the wheel. The pivot is used to adjust tension in the drive chain and figures in disconnecting the electric motor from the wheel such that the cart may be hand pushed until assistance is needed thus conserving battery power. For use with the pivoted electric motor, an idler sprocket is provided for the chain drive when disconnected from the drive sprocket for disconnecting the wheel from the motor.

In a preferred embodiment a cable is attached to the driven sprocket such that the cable may be attached to a fixed item such as a tree or wrapped around a rock and the electric motor can be used to pull the cart. This is a boon for a hunter working alone without the need for additional assistance.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings in which one of various possible embodiments of the invention is illustrated, corresponding reference characters refer to corresponding parts throughout the several views of the drawings in which:

FIG. 5 is a top view of the motor drive sprocket disengaged from the driven sprocket;

FIG. 6 is a detail side view showing an idler sprocket and the motor driven sprocket disengaged from the driven sprocket;

FIG. 7 is a front view showing a cable being attached to the driven sprocket; and, FIG. 8 is a detail of a ramp for use with the game cart.

DETAILED DESCRIPTION OF AT LEAST ONE PREFERRED EMBODIMENT OF THE INVENTION

Figure 1:
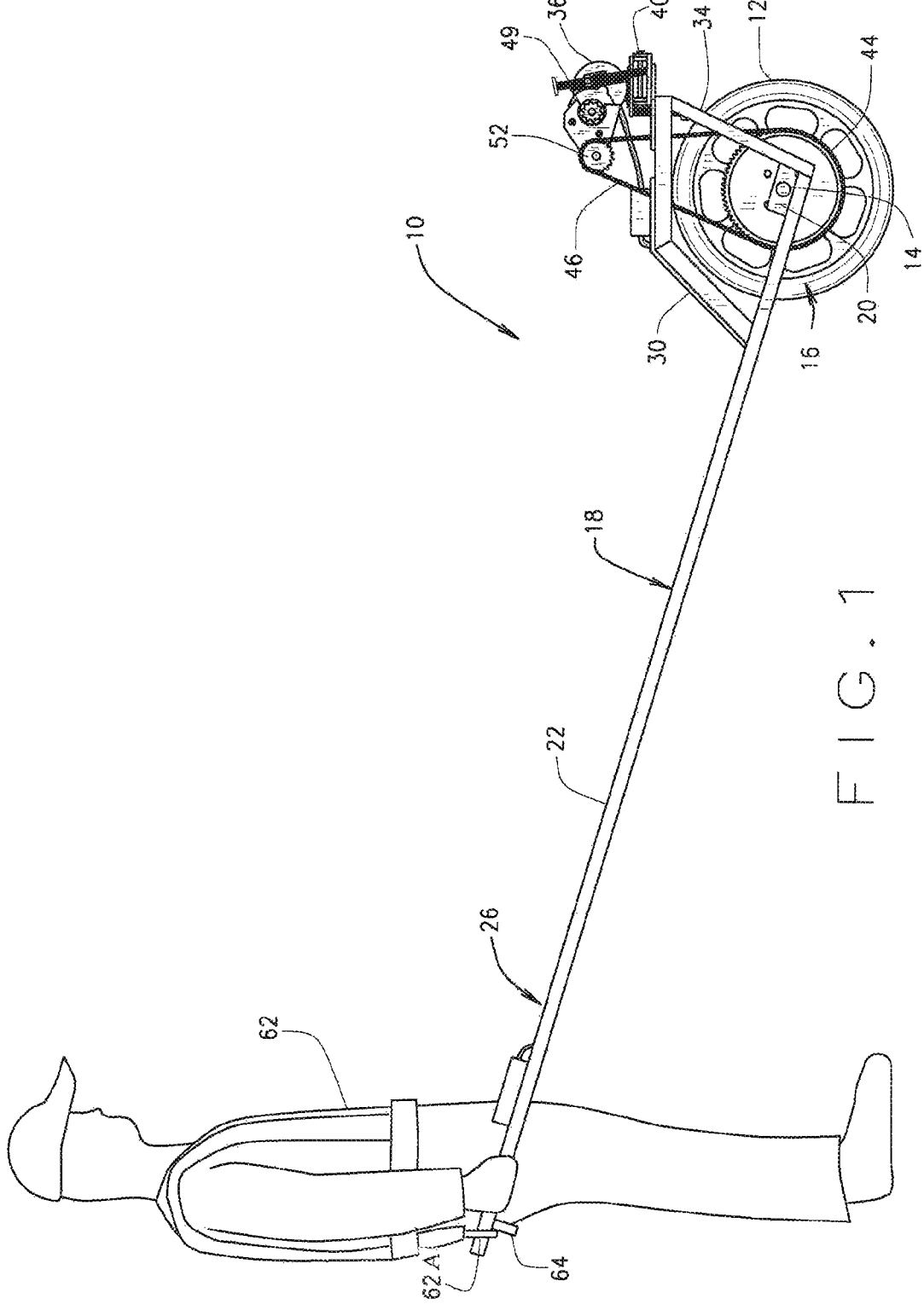
FIG. 1 is a side elevation of a hunter pushing a game cart with an electric motor mounted in front of the single wheel in accordance with the present invention.

Referring to the drawings more particularly by reference character, a game cart 10 in accordance with the present invention includes a single wheel 12 carried on an axle 14 positioned at a front end 16 of a frame 18. Opposite ends of axle 14 are carried by a support structure 20 provided on each of first and second handles 22,24. First and second handles 22,24 lie in the same plane and are separated from each other by a greater distance, e.g., approximately shoulder width, at a rear or operator end 26 and come together to be separated by a much shorter distance, e.g., a few inches, at the opposite or front end 16 of cart 10. Frame 18 further includes a platform for carrying a carcass of a game animal such as a deer provided by cross members 28 between first and second handles 22, 24 and a fender 30 mounted adjacent front end 16.

Handles 22,24 and cross members 28 are preferably formed of tubing or the like of sufficient size and strength to support an animal carcass and may be painted or otherwise treated to preserve both the appearance and functionality of the frame. As shown in the drawings, first and second handles 22,24 are shown as integral but may be formed of several components coupled together to form the handles. Handles 22,24, cross members 28 and the other components of frame 18 may be joined together in an appropriate manner, e.g., by welding or the use of appropriate fasteners. As such frame 18 may be collapsible or foldable for easier transport and storage of cart 10 when not in use. In the form shown in the drawings which is exemplary but not limiting, handles 22,24 are formed of 1" steel square tubing and cross members 28 are formed of 1" thick, ¾" wide steel and wheel 12 is a 20" bike tire.

As shown in the drawings, fender 30 is formed of expanded sheet metal with a raised pattern and is L-shaped with a viewing window 31 such that the hunter may see wheel 12. Fender is positioned forward on frame 18 such that the weight of the carcass is shifted as far as possible towards wheel 12 and the low end of cart 10 when in use. A free end 32 of L-shaped fender 30 is supported by first and second struts 34 provided on first and second handles 22,24 forward of axle 14 and support structure 20.

Figures 2, 3, 4:
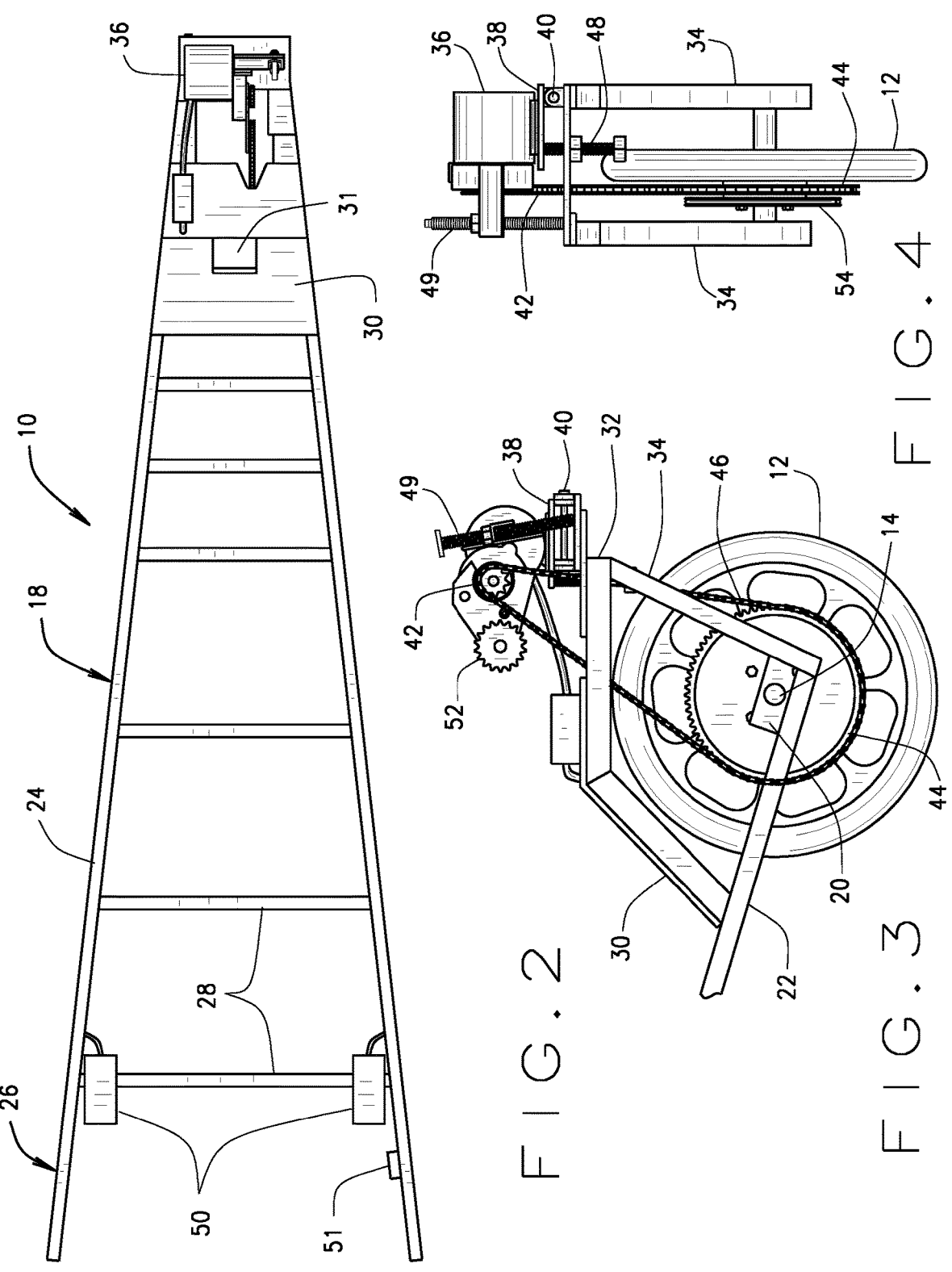
FIG. 2 is a top plan view of the game cart.
FIG. 3 is a detail side view showing a motor drive sprocket engaged with a driven sprocket attached to the wheel.
FIG. 4 is a front view of the motor drive sprocket engaged with the driven sprocket.

An electric motor 36 for driving wheel 12 is mounted adjacent free end 32 of L-shaped fender 30 on a plate 38 that pivots 40 perpendicular to axle 14. A gear chain includes a drive sprocket 42 operated by motor 36, a driven sprocket 44 attached to wheel 12 and a chain drive 46 for interconnecting the sprockets. Tension on chain drive 46 is adjusted by pivoting plate 38 with a threaded member 48 best seen in FIG. 7. A secondary threaded member 49 may be provided to dampen vibration. As seen in FIG. 3, rotation of drive sprocket 42 rotates driven sprocket 44 which causes wheel 12 to rotate. The output speed of motor 36 and relative size of drive sprocket 42 and driven sprocket 44 is preferably chosen to provide a maximum forward rate of travel approximately equal to three to six miles per hour, i.e., a rate of speed equivalent to a walking pace.

Electric motor 36 is powered by batteries 50 positioned on first and second handles 22,24 at rear or operator end 26 of frame 18. Batteries may be wired in parallel and are matched to the voltage requirements of electronic motor 36. An appropriate walking speed is accomplished, for example, with 18 v batteries and a 24 v gear reduction motor.

When an operator does not require the help of electric motor 36, it is desirable to save electric power and detach the chain drive from the motor. This is accomplished by allowing plate 38 to pivot 40 with threaded member 48 and secondary threaded member 49 releasing the tension on chain drive 46. The chain drive can then be repositioned on an idler sprocket 52 and retightened. As the hunter pushes cart 10 and wheel 12 rotates idler sprocket 52 will free wheel with chain drive 46. When power is needed, the above steps are reversed.

If an operator needs help pushing cart 10 up an embankment for example, a cable 54 may be bolted 56 to driven sprocket 44. With a ratchet released, cable 54 may be pulled out and attached to a tree or the like. Rotation of wheel 12 with the ratchet engaged, rewinds cable 54 and pulls cart 10 towards the point of attachment and up an embankment or the like. In other instances, if an operator needs help in climbing over a downed tree trunk, rock or the like, a forked ramp 58 may be carried on the underside of cross members 28 for use in the field. As shown in FIG. 8, forked ramp 58 allows wheel 12 to roll up and over such obstacles. To relieve the weight or at least some of the weight on the hunter's arms, the hunter may wear a shoulder harness 62 with right and left depending rings 62A. In use a downwardly extending finger 64 may be provided on first and second handles, 22,24 at rear end 26. Fingers 64 pass through rings 62A but prevent handles from accidentally slipping out of the rings.

In use, the wedge shape of cart 10 facilitates moving the cart through tall grass, brush, branches and the like with the rear of a downed animal at low center of gravity positioned against fender 30, which weight is counterbalanced by motor 36. The drive train may be used to connect and disconnect motor 36 from wheel to conserve battery power. With motor 36 engaged with wheel 12 cable 54 may provide further assistance such that a hunter working alone may handle the entire process of transporting game without the need for additional assistance.

As various changes could be made in the above constructions without departing from the scope of the invention, it is intended that all matter contained in the above description or shown in the accompanying drawings shall be interpreted as illustrative and not in a limiting sense.

What is claimed is:

1. A game cart comprising
a single wheel carried on an axle;
first and second handles forming a frame upon which the axle is mounted at a front end of the first and second handles, said first and second handles separated a shoulder width at a rear end and a smaller distance at the front end;
an L-shaped fender over the single wheel, said L-shaped fender mounted on the first and second handles adjacent the front end;
first and second struts mounted on the first and second handles forward of the axle, said struts supporting a free end of the L-shaped fender;
an electric motor mounted on the fender forward of the axle for driving the wheel, said motor operating a drive sprocket with a chain drive interconnecting the drive sprocket with a driven sprocket on the wheel; and,
an idler sprocket for the chain drive when disconnected from the drive sprocket for disconnecting the wheel from the motor.

2. The game cart of claim 1 with a cable attached to the driven sprocket.

3. The game cart of claim 1 with a window in the fender for viewing the wheel.

4. The game cart of claim 1 wherein batteries for operating the electric motor are positioned on the rear end of the frame under control of a switch.

5. The game cart of claim 1 with an auxiliary harness configured to be worn by an operator with right and left rings for supporting the rear end of the first and second handles, said handles having depending fingers configured to pass through the rings.

6. A game cart comprising
a single wheel carried on an axle;
first and second handles forming a frame upon which the axle is mounted at a front end of the first and second handles, said first and second handles separated a shoulder width at a rear end and a smaller distance at the front end, cross members between the first and second handles forming a platform for supporting a carcass of a game animal;
an L-shaped fender over the single wheel with a window for viewing the wheel, said L-shaped fender mounted on the first and second handles adjacent the front end;
first and second struts mounted on the first and second handles forward of the axle, said struts supporting a free end of the L-shaped fender;
an electric motor mounted on a plate pivoted on the fender forward of the axle for driving the wheel and perpendicular to the axle, said motor operating a drive sprocket with a chain drive interconnecting the drive sprocket with a driven sprocket on the wheel; a threaded member for pivoting the plate configured for use in adjusting tension in the chain drive; and, an idler sprocket for the chain drive when disconnected from the drive sprocket for disconnecting the wheel from the motor.

7. The game cart of claim 6 with a secondary threaded member for pivoting the plate and dampening vibration.

8. The game cart of claim 6 with a cable attached to the driven sprocket.

9. The game cart of claim 8 wherein the cable is attached to the driven sprocket with bolts.

10. The game cart of claim 6 wherein the electric motor, drive sprocket and driven sprocket are configured to drive the wheel at a walking pace.

\* \* \* \* \*